(12) United States Patent
Schaaf

(10) Patent No.: US 11,851,831 B2
(45) Date of Patent: Dec. 26, 2023

(54) GROUND MILLING MACHINE, IN PARTICULAR ROAD MILLER, WITH A CONVEYING APPARATUS FOR TRANSPORTING MILLED MATERIAL, AND METHOD OF CONVEYING MILLED MATERIAL OF A GROUND MILLING MACHINE

(71) Applicant: BOMAG GMBH, Boppard (DE)

(72) Inventor: Matthias Schaaf, Boppard (DE)

(73) Assignee: BOMAG GMBH, Boppard (DE)

( * ) Notice: Subject to any disclaimer, the term of this patent is extended or adjusted under 35 U.S.C. 154(b) by 0 days.

(21) Appl. No.: 17/444,570

(22) Filed: Aug. 6, 2021

(65) Prior Publication Data

US 2022/0042257 A1    Feb. 10, 2022

(30) Foreign Application Priority Data

Aug. 7, 2020   (DE) .................... 10 2020 004 839.0
Jul. 27, 2021   (DE) .................... 10 2021 119 491.1

(51) Int. Cl.
*E01C 23/088*   (2006.01)
*E01C 23/12*    (2006.01)
(Continued)

(52) U.S. Cl.
CPC .......... *E01C 23/088* (2013.01); *E01C 23/127* (2013.01); *B02C 21/026* (2013.01);
(Continued)

(58) Field of Classification Search
CPC ..... E01C 23/088; E01C 23/127; B65G 41/00; B65G 47/44; B65G 11/166; B65G 11/106;
(Continued)

(56) References Cited

U.S. PATENT DOCUMENTS 5,178,253 A * 1/1993 Fix .......................... B65G 21/14
                                                198/317
6,135,171 A * 10/2000 Weakly .................. B65G 47/44
                                                198/956
(Continued)

FOREIGN PATENT DOCUMENTS

CN    205687128    11/2016
CN    205837772    12/2016
(Continued)

OTHER PUBLICATIONS

Office Action from related Chinese Appln. No. 202110901166.0, dated Sep. 21, 2022.
(Continued)

*Primary Examiner* — Abby J Flynn
*Assistant Examiner* — Michael A Goodwin
(74) *Attorney, Agent, or Firm* — Grossman, Tucker, Perreault & Pfleger, PLLC

(57) ABSTRACT

A ground milling machine, comprising a machine frame, an operator platform, a drive engine, travelling apparatuses, a milling unit, a conveying apparatus for transporting milled material from the milling unit to a discharge point with a transfer conveyor and a downstream loading conveyor, and with a material transfer apparatus arranged in a material transfer region between transfer conveyor and loading conveyor, which material transfer apparatus is configured so as to direct milled material from the transfer conveyor to the loading conveyor, the transfer conveyor and the loading conveyor each comprising a support frame, wherein the material transfer apparatus comprises a milled-material-directing transfer chute, wherein the transfer chute has a chute guide surface extending at least partially in a horizontal direction and running in an at least partially descending manner from the transfer conveyor to the loading conveyor, and wherein the transfer chute is arranged at least partially (Continued)

immovably with respect to the transfer conveyor, and a method of conveying milled material by means of a conveying apparatus of a ground milling machine comprising a material transfer device with a transfer chute.

24 Claims, 5 Drawing Sheets

(51) Int. Cl.
  *B02C 21/02* (2006.01)
  *B65G 11/16* (2006.01)
  *B65G 11/10* (2006.01)
  *B65G 11/14* (2006.01)

(52) U.S. Cl.
  CPC ...... *B02C 2021/023* (2013.01); *B65G 11/106* (2013.01); *B65G 11/146* (2013.01); *B65G 11/166* (2013.01)

(58) Field of Classification Search
  CPC ...... B65G 11/146; B65G 47/58; B65G 47/62; B65G 47/66; B65G 47/72; B65G 47/52; B02C 21/036; B02C 2021/023
  USPC .... 198/311, 312, 313, 314, 315, 316.1, 317, 198/318, 319, 320, 370, 560; 193/2 R–2 E
  See application file for complete search history.

(56) References Cited

U.S. PATENT DOCUMENTS

| | | | |
|---|---|---|---|
| 6,296,318 B1 | 10/2001 | Simons et al. | |
| 6,457,779 B1 | 10/2002 | Busley et al. | |
| 10,428,471 B1 * | 10/2019 | Hirman | E01C 19/1063 |
| 11,072,894 B2 * | 7/2021 | Hirman | E01C 23/088 |
| 11,192,730 B1 * | 12/2021 | Schlenker | B65G 47/766 |
| 2014/0084665 A1 * | 3/2014 | Motz | E01C 23/127 |
| | | | 299/39.2 |
| 2017/0009409 A1 * | 1/2017 | Verhaelen | E01C 23/127 |
| 2019/0135553 A1 * | 5/2019 | Hirman | E01C 23/127 |
| 2019/0203430 A1 | 7/2019 | Wachsmann et al. | |
| 2019/0389667 A1 * | 12/2019 | Heim | E01C 23/12 |

FOREIGN PATENT DOCUMENTS

| | | |
|---|---|---|
| CN | 109750589 | 5/2019 |
| CN | 209337733 | 9/2019 |
| CN | 110482162 | 11/2019 |
| CN | 210479980 | 5/2020 |
| DE | 19726122 | 1/1999 |
| DE | 198141053 | 10/1999 |
| DE | 102017012124 | 7/2019 |
| EP | 3115508 | 4/2018 |

OTHER PUBLICATIONS

Office Action from related Chinese Appln. No. 202110901166.0, dated Apr. 25, 2023. English translation attached.

* cited by examiner

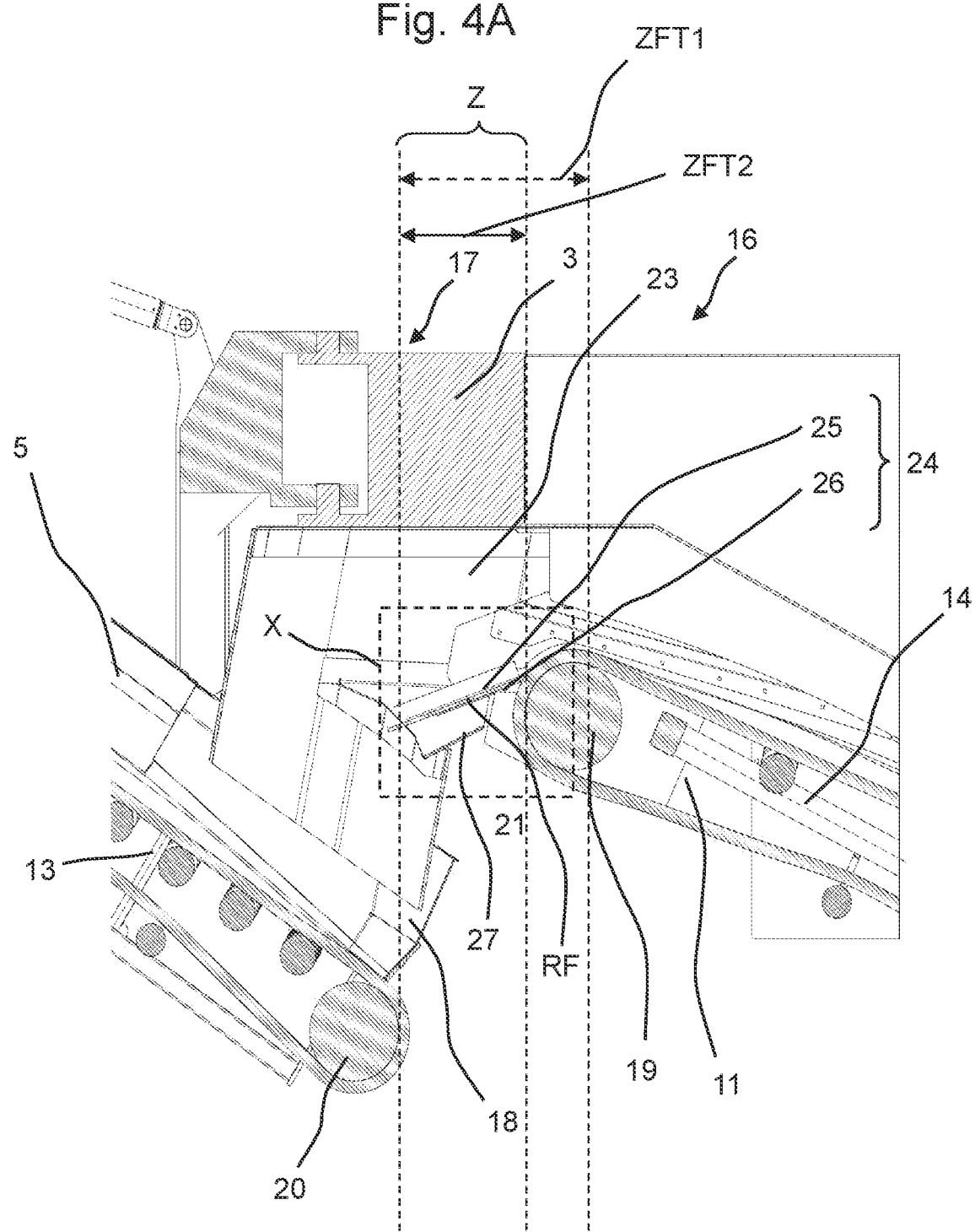

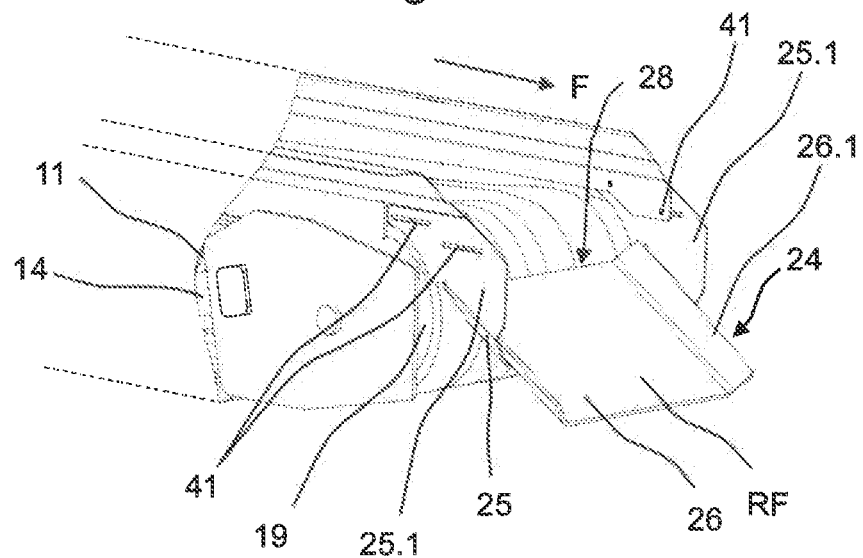
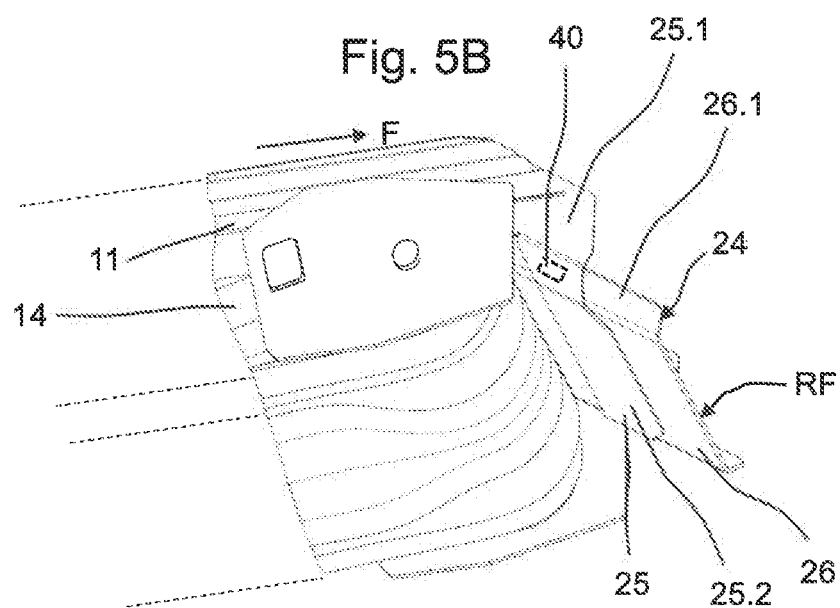

GROUND MILLING MACHINE, IN PARTICULAR ROAD MILLER, WITH A CONVEYING APPARATUS FOR TRANSPORTING MILLED MATERIAL, AND METHOD OF CONVEYING MILLED MATERIAL OF A GROUND MILLING MACHINE

FIELD

The invention relates to a ground milling machine, in particular a road milling machine, with a conveying apparatus for transporting milled material. In addition, the invention relates to a method of conveying milled material by means of a conveying apparatus of a ground milling machine comprising a material transfer device.

BACKGROUND

Generic ground milling machines, in particular road milling machines, are regularly employed in road and path construction for milling or breaking down ground material. They generally comprise a machine frame, a drive engine, travelling apparatuses driven by the drive engine, and a milling unit located in a milling drum box for milling ground material. During normal operation, the milled ground material collects in the milling drum box and has to be transported away continuously. For this purpose, the ground milling machine contains a conveying apparatus, which transports the ground material that has been milled, the milled material, from the milling unit in the milling drum box to a discharge point of the ground milling machine. At the discharge point of the conveying apparatus, the milled material leaves the conveying apparatus, for example to be discharged into a loading trough of a transport vehicle and transported away. The conveying apparatus can comprise two conveyors arranged one behind the other in series, specifically a first transfer conveyor and a loading conveyor, which is downstream in the conveying direction. Both conveyors are typically arranged so as to ascend in the conveying direction. The transfer conveyor can be arranged substantially within the machine frame and transports the milled material from the milling drum box through the inside of the machine to the loading conveyor. The loading conveyor can be arranged substantially outside the machine frame and transports the milled material to the discharge point. The loading conveyor is often mounted in a horizontally and/or vertically pivotable manner on the machine frame of the ground milling machine, so as to be able to optimize the discharge point to suit the individual operating conditions. During the work process, the transfer conveyor thus takes up the milled material, for example coming from a milling drum box, and directs it to the loading conveyor, which then discharges the milled material at the discharge point. Between transfer conveyor and loading conveyor there is an intermediate space, the material transfer region, in which the milled material is transferred from the transfer conveyor to the loading conveyor. Specifically, for the transfer, the milled material is discharged from a drop point of the transfer conveyor, often with at least a partial flight path. The milled material is then taken up by the loading conveyor and conveyed thereby as far as the discharge point. For the improved transfer of the milled material between the two conveyors, it is known to arrange a material transfer apparatus in the material transfer region, which directs the milled material coming from the transfer conveyor to the loading conveyor, bridging the intermediate space between the two conveyors. This is particularly important in order that no milled material falls through the intermediate space during the transfer, thus being lost. To this end, a receiving hopper is typically provided on the loading conveyor, which collects the milled material being guided by the material transfer apparatus and thus guides it directly to a receiving location of the loading conveyor.

The conveyors that are arranged one behind the other in the conveying direction, in particular so as to ascend in the conveying direction, generally comprise a support frame and an upper return pulley, i.e. arranged at the top end of the conveyor in the conveying direction, and a lower return pulley, i.e. arranged at the bottom end of the conveyor in the conveying direction, and optionally a plurality of support rollers. A conveyor belt circulates around the return pulleys and support rollers, the milled material lying on said conveyor belt during transport. One of the return pulleys, typically the upper return pulley, acts as a drive pulley, which is driven by a drive apparatus, for example a hydraulic motor. The upper return pulley as a drive pulley is advantageous in so far as the milled material lying on the conveyor belt can be conveyed with tension in this case.

Ground milling machines of the present type normally allow milling to be carried out at different milling depths. To this end, for example, the machine frame can be configured so as to be at least partially height-adjustable with respect to the travelling apparatuses of the ground milling machine by way of lifting apparatuses. To adapt the conveying apparatus to these various milling depths, it may be provided that the transfer conveyor is arranged with its bottom end in the conveying direction on a height-adjustable belt bearing, in particular a holding-down means. An arrangement of this type is described for example in DE102017012124A1, DE19726122A1 and DE19814053A1, to which reference is hereby made. The holding-down means can rest on the ground in a floating manner, for example, pressing the ground downwards in a vertical direction and thus counteracting undesirable clod formation, i.e. the formation of large fragments during milling. So that the holding-down means remains resting on the ground irrespective of the characteristics of the ground, the holding-down means follows the ground contours. Furthermore, the holding-down means always rests on the unmilled part of the ground, whereas the machine frame is positioned at different heights in a vertical direction relative to the unmilled ground, depending on the milling depth. Thus, the holding-down means is height-adjusted relative to the machine frame according to the milling depth. By adjusting the height of the holding-down means, the transfer conveyor, which can be arranged on the holding-down means, is also positionally adjusted.

As a consequence of this positional adjustment of the transfer conveyor, the relative position of the transfer conveyor and the discharge belt to one another, or the size of the intermediate space between transfer conveyor and loading conveyor, changes, i.e. the relative positions in the material transfer region change. Accordingly, for example, the flight path or landing point of the conveyed material thrown from the transfer conveyor can also change as a function of the current milling depth. Because with increasing milling depths the transfer conveyor is regularly displaced upwards in the machine frame with respect to its lower return pulley and forwards with respect to its upper return pulley, the intermediate space between transfer conveyor and loading conveyor is larger for small milling depths than for large milling depths. As a result, a gap can arise between transfer conveyor and loading conveyor, which can no longer be fully bridged by the material transfer apparatus. Specifically, as a result of the change in the flight path of the milled material, the milled material no longer lands directly at the intended receiving location of the loading conveyor. Instead, the discharged milled material lands in the intermediate space.

This can lead to the fact that, with small milling depths in particular, milled material falls through the gap and is lost when the milled material is being transferred from the transfer conveyor to the loading conveyor. A loss-free and efficient transfer is consequently no longer ensured. Besides the resulting material loss of the milled material, which could potentially have been further processed, a danger to the operator and other persons in the vicinity also arises. Furthermore, increased secondary operations may also be necessary.

SUMMARY

The invention is based on the object of creating a ground milling machine, and a method of conveying milled material in a ground milling machine, with which the above-mentioned problems in the prior art are solved. At the same time, a solution should be ensured which is as space-saving and as cost-effective as possible, with low potential for component wear or with readily replaceable components.

A generic, in particular a self-propelled, ground milling machine comprises a machine frame, an operator platform, a drive engine, travelling apparatuses driven by the drive engine, a milling unit for milling ground material, and a conveying apparatus for transporting milled material from the milling unit to a discharge point. The machine frame comprises the essential support structure of the ground milling machine. The ground milling machine is operated from the operator platform. The drive engine, usually a diesel combustion engine, provides the drive energy required for operating the ground milling machine. The travelling apparatuses, for example wheels and/or crawler tracks, can be connected at least partially to the machine frame via lifting apparatuses, in particular lifting columns. The milling unit can have in particular a milling drum, comprising for example a hollow cylindrical supporting tube, on the outside jacket surface of which a plurality of milling tools are arranged, and a milling drum box. During normal operation, the ground material is milled by the milling drum, which is externally enclosed by the milling drum box, and is collected inside the milling drum box. A transfer opening can be provided in the milling drum box, through which the milled material passes from the inside of the milling drum box on to the transfer conveyor. With the aid of a conveying apparatus, the milled material can then be moved away from the milling drum box towards a discharge point, for example for loading purposes, in and/or on the machine and relative to said machine.

The conveying apparatus has a transfer conveyor, which is in particular arranged substantially within the machine frame, and a loading conveyor which is arranged downstream in the conveying direction. The two conveyors are thus arranged in series away from the milling drum box with respect to the conveying direction of the milled material, and the milled material passes over them consecutively. Conveying apparatuses of generic ground milling machines have a clearance or intermediate space between the transfer conveyor and the loading conveyor, the material transfer region for the conveyed material. The upper return pulley of the transfer conveyor and the lower return pulley of the loading conveyor in particular are spaced apart from each other in the conveying direction, as viewed in a horizontal direction. Starting from a generic ground milling machine, in particular a road milling machine, it is provided according to the invention that the material transfer apparatus of the conveying apparatus, which is arranged in the material transfer region, comprises a milled-material-directing transfer chute. The transfer chute according to the invention has a chute guide surface extending at least partially in a horizontal direction and running from the transfer conveyor to the loading conveyor, i.e. in the conveying direction, in an at least partially descending manner, in other words obliquely downwards from the transfer conveyor towards the loading conveyor with respect to its chute guide surface. Preferably, in particular the higher edge of the transfer chute as viewed in a vertical direction is arranged at the level of the upper return pulley of the transfer conveyor, and an edge which is lower in a vertical direction is arranged closer to the lower return pulley of the loading conveyor in a vertical and in a horizontal direction. Furthermore, the transfer chute is arranged according to the invention at least partially, in particular completely, stationary with respect to the transfer conveyor. This leads to the fact that, during transfer, the milled material can slide along from the transfer conveyor to the loading conveyor on the chute guide surface of the transfer chute, and is thus guided by said transfer chute. This allows the milled material coming from the transfer conveyor to be collected and passed across to the loading conveyor in an improved manner Since the transfer chute is furthermore arranged at least partially stationary on the transfer conveyor, there is the further significant advantage that the transfer chute, and thus the chute guide surface, at least partially and in particular completely follows positional adjustments of the transfer conveyor relative to the machine frame and/or to the loading conveyor.

To facilitate this, it is preferably provided that the transfer chute is arranged or mounted, in particular directly and/or completely, on the transfer conveyor and in particular on the support frame of the transfer conveyor. The formation of a gap, through which the milled material can spill out, is consequently prevented by the fact that the chute guide surface of the transfer chute acts as an extension of the transfer conveyor, on which the discharged milled material can slide down to the loading conveyor in a controlled manner. This can also be achieved in particular by way of a detachable connecting apparatus in order to be able to replace the transfer chute entirely or partially, for example in the event of damage.

According to the invention, it is preferred if the transfer chute bridges at least 50%, particularly at least 70% and in particular at least 95% of the spaced-apart region between the upper return pulley of the transfer conveyor and the lower return pulley of the loading conveyor, in particular as viewed in a horizontal direction transverse to the axis of rotation of the return pulley of the transfer conveyor. These dimensions have proved particularly effective.

In addition or as an alternative, it can be provided that the material transfer apparatus comprises a hood-like covering, in particular consisting at least partially of an elastic material, on which, in particular on the inside of which, for stability reasons, the transfer chute is at least partially, but also completely, arranged or mounted. Thus, the transfer chute is likewise protected by the hood-like covering, which additionally facilitates the loss-free, efficient and thus also low-emission transfer of the milled material from the transfer conveyor to the loading conveyor. The hood-like covering in this case can surround the transfer chute at least laterally and partially also from above in a vertical direction. In particular, the bottom of the transfer chute opposite the chute guide surface can also be at least partially surrounded by the covering of the material transfer device. Furthermore, the transfer chute can in particular also be arranged on the hood-like covering and preferably directly on the covering.

Furthermore, the material transfer apparatus can additionally also comprise a support structure, consisting in particular of rigid material, which supports the covering but can also have a milled-material-directing function. In an alternative embodiment, the transfer chute is arranged or mounted at least partially on the support structure, but in particular resting on the support structure at least partially overlappingly.

The specific design of the chute surface itself can vary. For example, it can have a planar or U- or V-shaped cross-sectional profile, i.e. vertically and transverse to the conveying direction. Variations with respect to the longitudinal profile, i.e. a cross-section vertically and in the conveying direction, are also possible. This can for example be configured in a straight line, descending in the conveying direction in a bent manner or in a stepped manner, etc. Furthermore, the chute guide surface can be configured for example in one piece or in multiple pieces, in a single material or consisting of different materials.

To allow not only a guiding of the milled material in the conveying direction, but in particular also to create a barrier for the milled material towards the side or in this direction, it is advantageous and therefore preferred if the transfer chute has two side guide walls running at the sides of the chute guide surface. These project upwards beyond the chute guide surface in a horizontal direction and in this way prevent milled material from falling off the chute surface transverse to the conveying direction. They preferably extend in the direction of the chute guide surface. They can be arranged or mounted as an extension on the support frame of the transfer conveyor or the covering of the material transfer apparatus. Thus, the transfer chute acquires a trough-like shape, which prevents conveyed material from falling off the sides of the transfer chute. The side guide walls can be arranged immovably relative to the chute guide surface, but also adjustably, for example by means of suitable detachable fixing means, such as screw connections. They can furthermore be configured in one part or in multiple parts. It is also possible to form the side guide walls only detachably, but not so as to be fixable in various positions. In both cases, the side guide walls can in this way be replaced and renewed separately, for example in the case of damage and/or wear.

Particularly preferably, it is further provided for the material transfer apparatus to comprise a receiving hopper arranged on the loading conveyor, into which receiving hopper parts of the material transfer apparatus, in particular the transfer chute, lead. This can even go so far that the transfer chute projects into the receiving hopper. Thus, the conveyed material can slide from the transfer conveyor along the chute guide surface of the transfer chute into the receiving hopper of the loading conveyor, where it is collected and directed to a receiving location directly on the loading conveyor.

According to the invention, the transfer chute is at least partially lockable with the aid of a detachable locking apparatus in various relative positions with respect to the transfer conveyor, in particular with respect to the conveyor belt of the transfer conveyor, in particular directly on the support frame of the transfer conveyor. The conveyor belt is generally replaceable. It is thus possible for conveyor belts with different measurements, in particular different thicknesses, to be used in the same support frame. The detachable and adjustably fixable locking apparatus ensures that, irrespective of the measurement of the conveyor belt, the transfer chute can be arranged in an ideal position on the conveyor belt. The mounting and locking apparatus of the transfer chute is therefore preferably also configured such that the transfer chute is adjustable within a pivot region and/or a linear adjustment region relative to the rest of the transfer conveyor. Furthermore, the transfer chute can particularly advantageously follow the positional adjustment of the transfer conveyor, which minimizes the formation of a gap through which conveyed material can escape. This appears to be particularly successful if the transfer chute is arranged completely immovably with respect to the rest of the transfer conveyor, and in particular directly thereon. In particular, this compensates for the change in vertical position of the holding-down means relative to the machine frame caused by different milling depths or its height adjustment caused by uneven ground, which results in the adjustment of the transfer conveyor.

It has been shown in practice that, during transport of the milled material, even after the substantially complete transfer of the milled material from the transfer conveyor to the loading conveyor, small particles remain stuck to the conveyor belt of the transfer conveyor. These can in part be flung away forwards in the conveying direction or vertically downwards at the upper return pulley of the transfer conveyor. In particular, these particles are often flung forwards under the transfer chute, such that they contaminate components in the region of the lower return pulley of the loading conveyor, for example the receiving hopper, parts of the covering etc. To be able to counteract this effect efficiently, it is advantageous if an impingement shield is arranged on the transfer chute, extending downwards, in particular vertically, from the vertically lower side of the transfer chute. The impingement shield can be arranged on the bottom of the transfer chute and fastened thereto. It is preferably flat, in particular planar, in configuration and has an unbroken surface. The impingement shield is configured, for example, as a rigid or elastic sheet, in particular a rubber sheet, rubber apron or as a metal sheet. The impingement shield extends from the transfer chute preferably to vertically below the upper return pulley of the transfer conveyor. Moreover, the impingement shield preferably extends horizontally and transverse to the conveying direction at least beyond the full extension of the conveyor belt of the transfer conveyor. In this way, it is ensured that particles that are flung away from the transfer conveyor impinge on the impingement shield and can fall therefrom to the ground. A contamination of other components, for example in the region of the receiving hopper of the loading conveyor, is avoided in this way. The impingement shield can be arranged on the transfer chute via detachable fastenings. It is also possible to mount the impingement shield adjustably, in particular such that it is fixable at various height positions in a vertical direction relative to the rest of the transfer chute.

A further advantageous development provides that the transfer chute is configured in at least two parts. It is advantageous here, for example, if the transfer chute comprises a mounting apparatus and a chute surface element. The chute surface element forms the chute surface and is connected to the mounting apparatus in such a way that it is held in position. This can take place for example via form-fitting and or frictional engagement connections, specifically for example a clamping apparatus, screw connections etc. It is ideal if the connecting apparatus used is configured so as to allow the chute surface element on the mounting apparatus of the transfer chute to be replaced, for example in the event of advanced wear. In this case, it is not necessary to replace the whole transfer chute, but just the chute surface element. The connecting apparatus, which fixes the chute surface element on the mounting apparatus of the transfer chute, is therefore also preferably configured detachably. In addition or as an alternative, it is also possible that the chute surface is formed by a plurality of elements. In some cases these can also be part of the mounting apparatus at the same time, or they can be a plurality of chute surface elements that are separate from the mounting apparatus. The elements in this case can, at least in part, have the same surface dimensions (i.e. width and length). These multi-part elements of the transfer chute or of the chute guide surface, i.e. in particular also the chute surface element and the mounting apparatus, of the transfer chute can in particular also be arranged adjustably relative to each other and/or detachably. Furthermore, the elements forming the transfer chute, in particular the chute guide surface, can also be separately replaceable. This leads to the fact that, in the event of wear of an element of the chute guide surface, it is not necessary to replace the whole transfer chute, which saves resources. In particular, the transfer chute can have a dimensionally stable and/or substantially non-elastic first element, in particular as the mounting apparatus, and an elastic second element, in particular as the element forming the chute guide surface. The elements in this case can be arranged at least partially one behind the other in the conveying direction and/or at least partially one above the other in a vertical direction. In particular, the element forming the chute surface can be arranged above the element forming the mounting apparatus in a vertical direction. Since the elastic elements typically wear more rapidly, it is thus also possible to replace only the elastic element in the event of wear, for example. In this case, the dimensionally stable first element can be arranged in front of or behind the elastic second element in the conveying direction. In this respect, either the dimensionally stable first element or the elastic second element, but in particular the dimensionally stable first element, can be arranged on the transfer conveyor or on the support frame of the transfer conveyor. It is particularly preferred that an element of the transfer chute, ideally the mounting apparatus, is arranged directly on the machine frame and/or on the support frame of the transfer conveyor and that another element, in particular the chute surface element, is arranged directly on the other element. One of the elements in this case can preferably also be arranged exclusively on the other element.

In a multi-part transfer chute, it can for example be provided that an element, in particular the dimensionally stable first element, can be installed on the machine frame or at least immovably with respect to the machine frame, wherein the element can also be installed adjustably and/or detachably on the machine frame. The other element, on the other hand, in particular the elastic second element, is installed either on the support frame of the transfer conveyor, in particular also adjustably or detachably, and/or directly on the other element. Alternatively, one element, in particular the dimensionally stable first element or the mounting apparatus, can also be installed on the support frame of the transfer conveyor, in particular also adjustably or detachably, and the other element, specifically at least one chute surface element, can then be installed either on the machine frame, in particular also adjustably or detachably, and/or directly on the other element. However, it is also possible that a plurality of or all the elements of the transfer chute are fastened on the machine frame and/or on the support frame, in particular if the elements are arranged overlappingly.

In principle, it can be provided that the transfer chute represents a single substantially fixed assembly. However, it can also be provided that a plurality of parts of the assembly forming the transfer chute are also positioned relative to each other in such a way that they adopt a different relative position to each other, for example they slide along each other, at various milling depths or at various relative positions of the transfer conveyor relative to the machine frame.

The first element, in particular the mounting apparatus, of the transfer chute preferably consists of a metal, in particular a bent metal sheet. However, it can also consist for example of a dimensionally stable plastic. It is ideal if the first element is configured as a mounting apparatus that can be fixed on the support frame of the transfer conveyor on both sides, in particular a trough-like mounting apparatus and most particularly one that is configured in one piece. This can in particular be configured such that it spans the width of the conveyor belt horizontally transverse to the conveying direction. Furthermore, in each of its two opposing side regions it can have a wall element, in particular projecting vertically, via which a fastening on the support frame of the transfer conveyor takes place. In the width of the conveyor belt, on the other hand, the mounting apparatus is preferably configured in a substantially planar manner to carry, fix and support the preferably flexible chute surface element (second element) in this area.

The elastic second element, in particular the chute surface element, can preferably consist of a flexible, elastic material, in particular an elastic plastic or rubber. This is ideally configured as a substantially flat element beyond which, at the sides, the mounting apparatus preferably projects horizontally and transverse to the conveying direction, coming from below. It can be provided that the chute surface formed by the chute surface element is completely free from any fastening means and the fixing of the chute surface element on the mounting apparatus takes place exclusively in the side region and/or below the chute surface element.

The elements of the transfer chute can also be arranged at least partially or else completely overlappingly in an overlap region. In particular, it is preferred if the dimensionally stable first element, in particular the mounting apparatus, is arranged below the elastic second element in a vertical direction. In this way, the dimensionally stable first element can support the second element. The overlap region in this case is preferably arranged below the top end of the transfer conveyor and/or below the discharge point of the loading conveyor in a vertical direction. It is ideal if the overlap region extends downwards in a vertical direction no further than to the lower vertex of the upper return pulley of the transfer conveyor. It is particularly preferred if the elements overlap by at least 30%-90% of their total surface. It is furthermore preferred that the elements of the transfer chute are arranged overlappingly in the overlap region irrespective of the milling depth and the associated adjustment of the transfer conveyor, such that an unbroken chute sliding surface for the milled material is formed.

In the overlap region, the milled material thus slides over the top element in a vertical direction, in particular the elastic second element. The bottom element in a vertical direction, in particular the dimensionally stable first element, supports the element lying thereon. This prevents the chute guide surface of the transfer chute from being pulled downwards by the weight of the milled material, in particular if the transfer conveyor changes its vertical position and the flight path of the milled material discharged from a discharge point of the transfer conveyor is thereby changed, such that a large portion of the milled material collects in the transfer region. In contrast to the prior art, the advantage thus exists that even in the event of a change in the dimensions of the material transfer region, i.e. a change in the distance between material transfer conveyor and loading conveyor, no gap is formed through which conveyed material can fall.

A further aspect of the invention relates to a method of conveying milled material of a ground milling machine according to the invention. Essential steps of the method according to the invention comprise first milling the ground by means of a milling unit, transporting the milled material from the milling unit to the material transfer region by means of transfer conveyor, transferring the milled material from the transfer conveyor to a material transfer apparatus arranged in the material transfer region, directing the milled material along the transfer chute of the material transfer apparatus, transferring the milled material on to the loading conveyor, transporting the milled material by means of the loading conveyor to the discharge point, and discharging the milled material at the discharge point.

BRIEF DESCRIPTION OF THE DRAWINGS

The invention will be explained in more detail below with the aid of the exemplary embodiments shown in the figures. These show schematic representations of the following:

FIG. 4A is a cross-sectional view of the region I from FIG. 1 in a vertical direction and in a longitudinal or forwards direction of the ground milling machine from FIG. 1 for a large milling depth;

FIGS. 5A and 5B are perspective oblique views of the upper region of the transfer conveyor from FIGS. 3 and 4 from diagonal front left (FIG. 5A) and diagonal bottom left (FIG. 5B).

DETAILED DESCRIPTION

Identical components are provided with identical reference signs in the figures, with repeating components not all being labelled separately in the figures.

Figure 1:
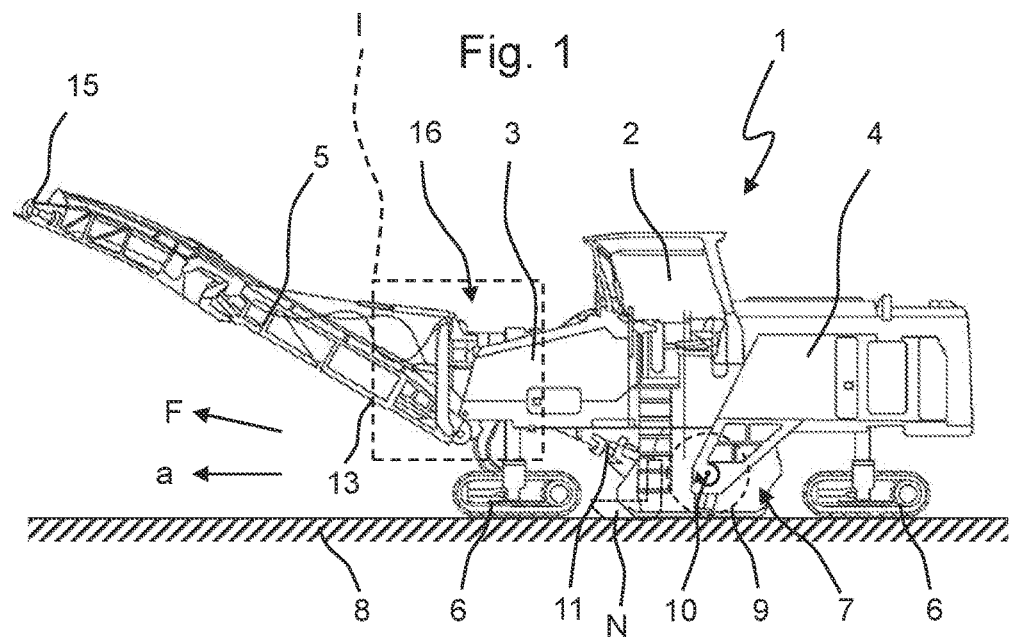
FIG. 1 is a side view of a ground milling machine of the road milling machine type.

FIG. 1 shows a generic ground milling machine 1, specifically of the road milling machine type. The ground milling machine shown is a machine with a milling drum box arranged between the front and rear travelling apparatuses 6 in the longitudinal direction. However, the invention is in particular also applicable to machines in which the milling drum box is positioned in the rear region of the machine. Essential elements of the ground milling machine are an operator platform 2, from where an operator can control the ground milling machine, a machine frame 3, a drive engine 4, travelling apparatuses 6 driven by the drive engine, specifically crawler tracks (but wheels can also be used), and a milling unit 9 (indicated with a broken line) located in a milling drum box 7 and rotatable about an axis of rotation 10 running horizontally and transverse to the working direction a, specifically a milling drum for milling ground material of the ground 8. During normal operation, the self-propelled ground milling machine 1 travels in the working direction a over the ground 8, lowering the milling unit 9 into the ground 8 with a milling depth and thereby milling ground material in a manner known from the prior art. The ground material that has been milled, the milled material, collects in the milling drum box 7 and, during normal operation, is continuously transported away in the conveying direction F by a conveying apparatus 12 to a discharge point 15. From the discharge point 15, the milled material is then deposited on the ground, for example, or loaded into a transport vehicle, which is in this case travelling ahead.

Figure 2:
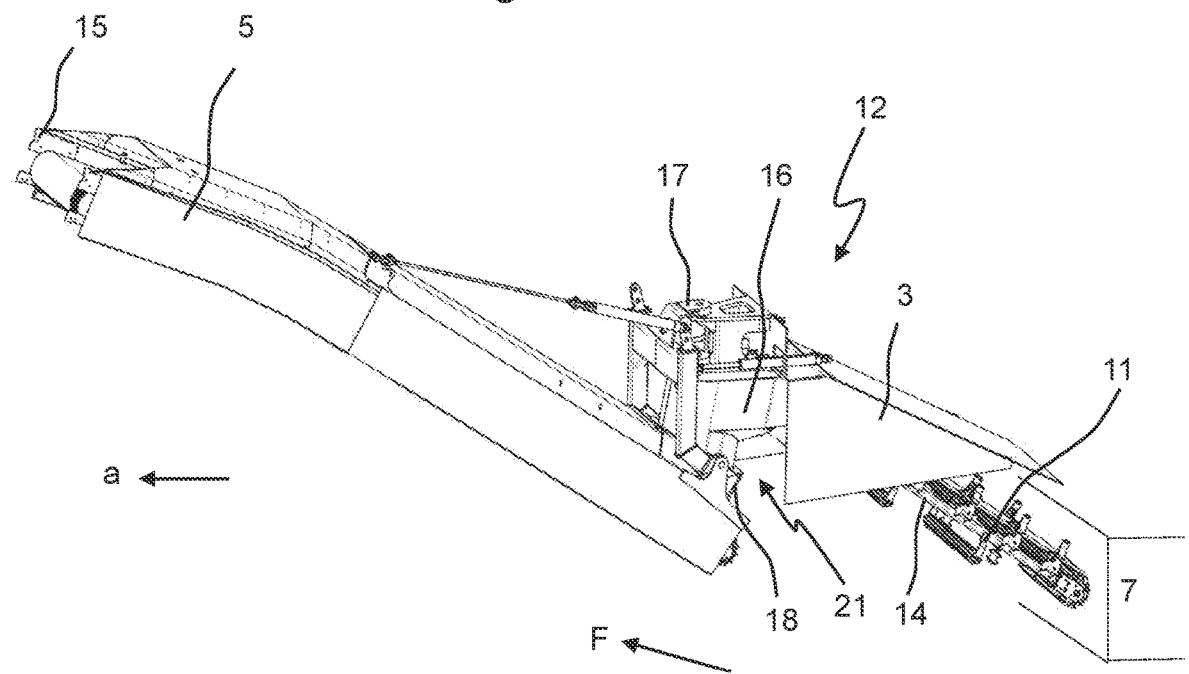
FIG. 2 is a perspective side view of the conveying apparatus from FIG. 1.

The conveying apparatus 12 comprises a transfer conveyor 11, comprising in particular a support frame 14, and a loading conveyor 5 which is downstream in the conveying direction F, comprising in particular a support frame 13. Between transfer conveyor 11 and loading conveyor 5, in particular between an upper return pulley 19 of the transfer conveyor 11 and a lower return pulley 20 of the loading conveyor 5, there is an intermediate space Z viewed horizontally in the forwards direction a (FIG. 3, FIG. 4A), the material transfer region 21. The transfer conveyor 11 conveys the milled material from the milling drum box 7 (which is merely indicated in FIG. 2) to a drop point of the transfer conveyor 11, from where the milled material is discharged and thereby transferred to the loading conveyor. The milled material that has thus been cast over crosses the clearance of the material transfer region 21 between transfer conveyor 11 and loading conveyor 5 here. For the optimized transfer of the milled material from the transfer conveyor 11 to the loading conveyor 5, a material transfer apparatus 16 is arranged in the material transfer region 21. This at least partially spans the region lying between the transfer conveyor 11 and the loading conveyor 5 in the conveying direction, such that after the milled material has been discharged from the discharge point, it is directed to the loading conveyor 5 and collected. In this way, an escape of the conveyed material, for example by the conveyed material falling through the intermediate space between transfer conveyor 11 and loading conveyor 5, is avoided.

Figure 3:
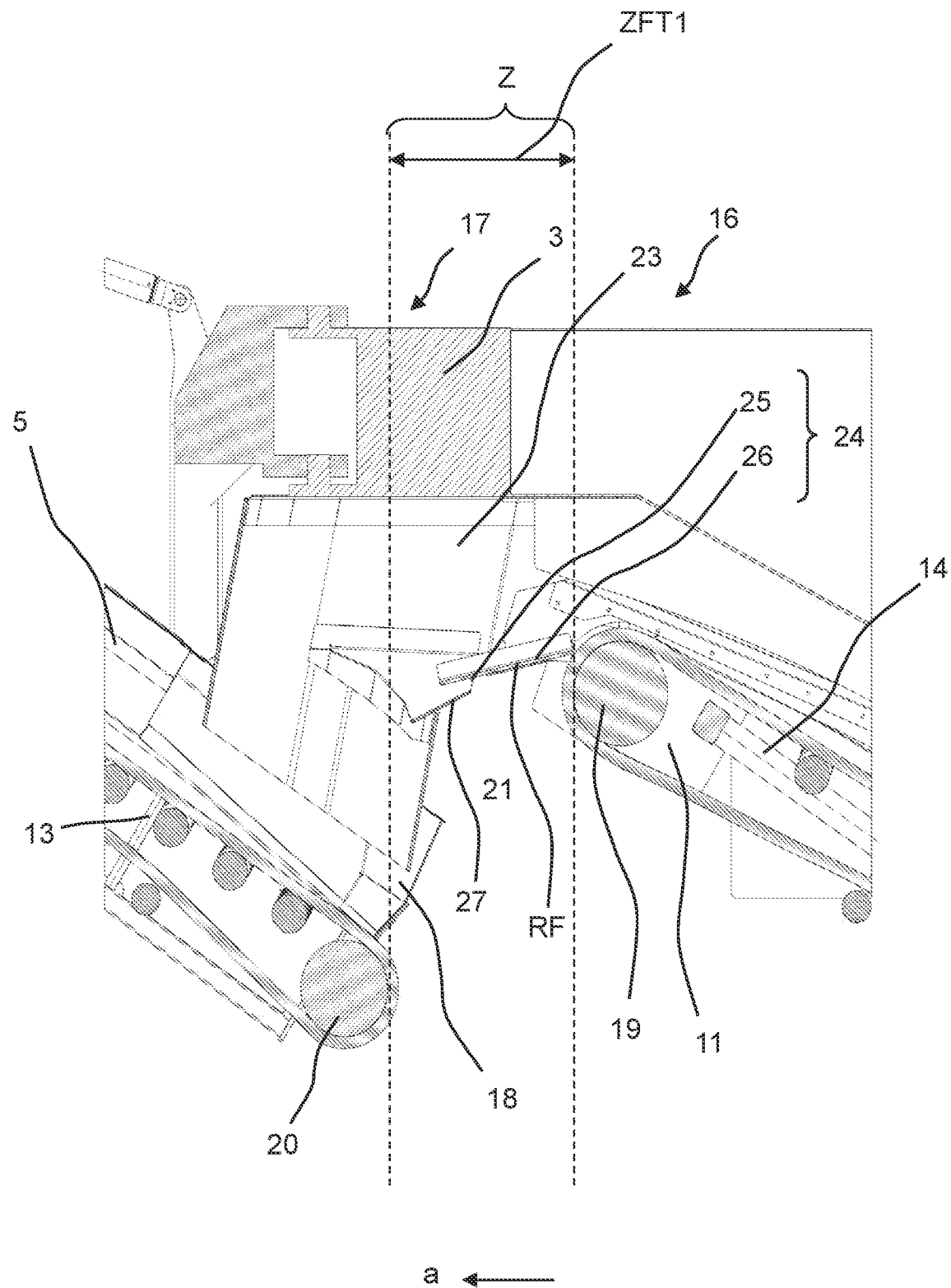
FIG. 3 is a cross-sectional view of the region I from FIG. 1 in a vertical direction and in a longitudinal or forwards direction of the ground milling machine from FIG. 1 for a small milling depth.

FIGS. 3 to 5B illustrate further details more clearly. FIGS. 3 and 4 are cross-sectional views of the machine region shown with the border I in the machine from FIG. 1. However, only the parts that are relevant to the conveying process of the milled material, and therefore to the present invention, are illustrated. The section plane here runs upwards in the middle of the machine in a vertical direction and in a forwards direction A. FIGS. 5A and 5B, on the other hand, are perspective plan views of the top region of the transfer conveyor 11, in which the transfer chute is arranged, as will be explained in further detail below.

The material transfer apparatus 16 comprises a material transfer chute 24 (FIGS. 3 to 5B), having a chute guide surface RF extending at least partially in a horizontal direction and running in an at least partially descending manner away from the transfer conveyor 11 and towards the loading conveyor 13 in the conveying direction F. Conveyed or milled material can thereby slide from the transfer conveyor 11 to the loading conveyor 5. As shown in the present exemplary embodiment, the chute guide surface RF can be configured in a substantially planar manner. The milled material coming from the transfer conveyor 11 cannot in practice therefore leave the intermediate space Z in a vertically downwards direction and thus escape from the conveyed stream, since those portions of the milled material of which the intrinsic speed is insufficient to pass completely across the intermediate space Z from the transfer conveyor 11 to the loading conveyor 13 are directed onwards towards the loading conveyor 13 by the transfer chute.

FIGS. 3 and 4 in particular illustrate more clearly a significant advantage of this embodiment. The transfer conveyor 11 is not fixed immovably in the machine frame of the machine, but changes its relative position relative to the machine frame as a function of the current milling depth. This can be attributed for example to the fact that the transfer conveyor 11 is mounted at its bottom point in a height-adjustable holding-down means (indicated in FIG. 1 by dashed lines and labelled N) and therefore the transfer conveyor 11 is in part "entrained" in the event of a height adjustment. In the upper region, the transfer conveyor can be mounted displaceably via a bearing point such that, as a result, a height adjustment of the holding-down means N causes a displacement of the transfer conveyor 11 in the upper top region (also) in a horizontal direction in or against the forwards direction of the machine, according to the design. The relative positions of the transfer conveyor 11 and the loading conveyor 13 therefore change as a function of the milling depth, such that the relationships between these two conveyors in the transfer region also vary.

FIGS. 3 and 4 illustrate this more clearly. Here, the horizontal extension (in the forwards direction a) of the intermediate space Z or the horizontal clearance Z between the upper return pulley 19 of the transfer conveyor 11 and the lower return pulley 20 of the loading conveyor 13 that follows the transfer conveyor 11 in the conveying direction is shown with Z. This corresponds approximately in a horizontal direction to that of the milled material between the two. FIG. 3 reproduces the relationships for a large milling depth (FT1) and FIG. 4A the relationships for a small milling depth (FT1). For a small milling depth FT2, the horizontal clearance ZFT2 to be crossed by the milled material is considerably smaller than the horizontal clearance ZFT1 for a large milling depth FT1 (to illustrate this more clearly, the clearance ZFT1 is also indicated in FIG. 4A for a direct comparison). The transfer conditions in the region of the material transfer apparatus 16 therefore also change as a function of the milling depth FT. The transfer chute 24 according to the invention now ensures that a reliable transfer of the milled material from the transfer conveyor 11 to the loading conveyor 13 takes place over the entire range of possible milling depths FT without the need for readjustment and/or additional measures.

In order for the milled material not to fall downwards on to the ground through the intermediate space ZF when positional changes to the transfer conveyor 11 occur during normal operation, the transfer chute 24 is arranged, completely in the present exemplary embodiment, immovably relative to the transfer conveyor 11. In the event of a positional change or height adjustment of the transfer conveyor 11, the transfer chute 24 thus follows the transfer conveyor 11 and likewise changes position, such that falling milled material is reliably directed to the loading conveyor 5. It is thus ensured that the transfer chute 24 allows adequate material guidance for the milled material between the two conveyors 13 and 14 at any relative position of the transfer conveyor 24 relative to the machine frame. In this respect, it is particularly preferred if, as shown in the figures, the transfer chute 24 is arranged directly and in particular completely on the transfer conveyor 11, in particular on the support frame 1. It is preferred if the transfer chute 24 bridges at least 70% of the material transfer region 21 or the above-defined clearance region Z in the horizontal direction a, particularly also in the event that the milling drum is standing on the unmilled ground. This ensures reliable material guiding results even for extremely small milling depths, such as for example fine milling.

As illustrated more clearly by FIG. 3, the material transfer apparatus 16 can comprise a hood-like covering 23 in addition to the transfer chute 24. This can allow the transfer space to be shielded from the outside, for example to counteract excessive dust generation towards the outside. This covering can be in one part or in multiple parts. The covering can preferably be fastened on the machine frame.

Furthermore, a receiving hopper 18 can be arranged in particular on the loading conveyor 13, with the aid of which the milled material being directed along the transfer chute 24 can be directed on to the loading conveyor 13 in a collected and guided manner. In particular a proboscis-like protrusion of the covering 23 can project into said receiving hopper 18. The receiving hopper 18 can comprise sealing means which create a seal between the protrusion and the receiving hopper 18 to counteract an outward egress of dust at this point too. A sealing means of this type can, for example, be a rubber lip or similar. With the aid of the receiving hopper 18 on the loading conveyor 13 and the covering 23, in particular the protrusion thereof, an effective dust seal towards the outside can be achieved in this region, even if the relative position of the loading conveyor 13 changes, without separate adaptation measures being required for this purpose. Furthermore, the exemplary embodiment in FIG. 4A shows that a receiving hopper 18 rests on the loading conveyor, collects the milled material sliding from the transfer chute 24 and directs it directly on to the loading conveyor. In the specific exemplary embodiment, in particular the support structure 22 of the material transfer apparatus 16 projects into the receiving hopper 18 for this purpose.

The transfer chute 24 does not necessarily have to be configured such that it also bridges the maximum gap ZFT1 completely. It can be provided that an auxiliary chute 27 is provided for this purpose, which is immovable with respect to the machine frame and which can take on a material-directing function in the conveying direction of the milled material, in particular behind the transfer chute 24. However, it is essential that the auxiliary chute 27 is positioned preferably below the transfer chute 24 in a vertical direction. It can then be bridged by the transfer chute 24 with a large milling depth or small clearance ZFT2 by the transfer chute and is not in the way thereof.

Figure 4B:
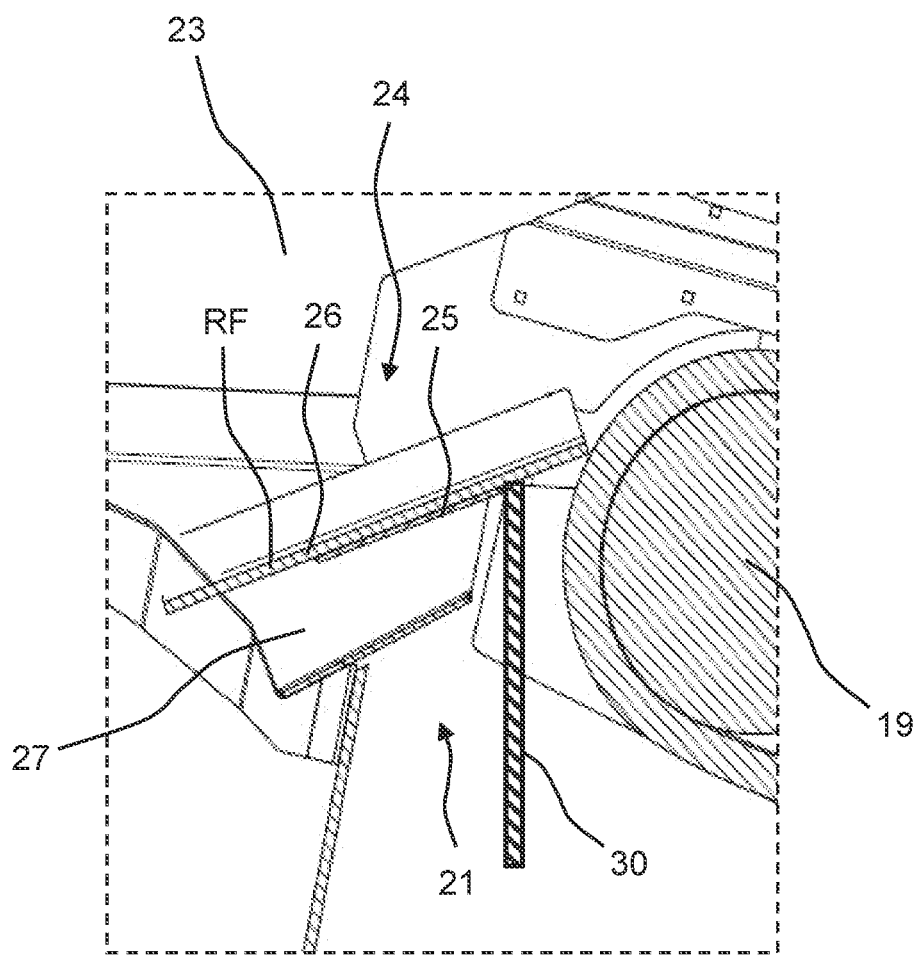
FIG. 4B is a detail view according to the cut-out X from FIG. 4A.

In FIG. 4B, a detail view of the cut-out labelled X in FIG. 4A is shown. In particular, the figure shows the arrangement of an impingement shield 30 on the transfer chute 24. In the exemplary embodiment shown, the impingement shield 30 is configured as impact rubber or impact plate. It is installed in a fixed manner on the bottom of the transfer chute 24. The impingement shield 30 in particular shields the transfer conveyor 11 at the front below the transfer chute in the working direction a in the region of the upper return pulley 19. Small particles of dirt that are flung away from the conveyor belt of the transfer conveyor 11 when the belt is deflected impact against the impingement shield 30 and fall vertically downwards from here to the ground. In this way, the particles of dirt are prevented from being able to be flung further forwards and contaminating in particular, for example, the receiving hopper 18 or other components in this region.

Details of the specific construction of the transfer chute and the fastening thereof can also be taken in particular from FIGS. 5A and 5B. FIGS. 5A and 5B each show in a perspective plan view only a cut-out of the assembly comprising transfer chute 24 and transfer conveyor 11. The continuation of the transfer conveyor 11 against the conveying direction is indicated with phantom lines in FIGS. 5A and 5B for further clarification. As set forth prior, the transfer chute 24 is at least partially lockable with the aid of a detachable locking apparatus 41 in various relative positions with respect to the transfer conveyor 11, in particular with respect to the conveyor belt of the transfer conveyor 11, in particular directly on the support frame 14 of the transfer conveyor 11.

The transfer chute 24 can be configured in one part or in multiple parts. In the latter case, it can be provided that the chute surface RF is formed from a plurality of elements or, as in the present exemplary case, from one element. The advantage of this variant lies in the fact that only one element is subject to increased wear due to the milled material sliding along it. In the present exemplary embodiment, furthermore, an optional variant is shown, according to which the transfer chute 24 is exclusively immovable relative to the transfer conveyor 11 and thus moves together with the transfer conveyor 11 in the event of a relative adjustment thereof. The present variant of the transfer chute 24 comprises two essential elements 25 and 26. The first element 25 here has a substantially carrying and supporting function, whereas the second element 26 here exclusively forms the chute guide surface RF and is held by the first element 25. The first element 25 can therefore also be referred to as a mounting apparatus or mounting element and the second element 26 as a chute surface element.

The first element 25 can be configured as a dimensionally stable plastic or sheet metal element, ideally in one piece and solidly. It can have two lateral fastening walls 25.1 projecting in a vertical direction, by way of which the, preferably detachable, fastening takes place on the transfer conveyor 11, in particular directly on the support frame 14 of the transfer conveyor 11. Between the two fastening walls 25.1 a connection portion 25.2, which is in particular configured in a trough-like manner, can be provided, spanning the width of the transfer conveyor 11. This connects the two side walls and, as will be described in more detail below, serves to support and position the second element.

It may be advantageous if the nature of the fastening of the first element 25 is on the one hand detachable and on the other hand also permits a relative adjustability of the first element 25 relative to the transfer conveyor, whether this be linear, for example towards the conveying direction, and/or rotational, for example to change the pitch angle of the first element 25 against the transfer conveyor 24. Screw connections can preferably be used for this purpose.

The second element 26 here forms the chute guide surface RF and is thus the element that is substantially also in contact with the milled material. It can be configured as a dimensionally stable or elastic element. A preferably used material is rubber, in particular fabric-reinforced rubber. The second element here is configured as a substantially planar element, which is held in shape and position by the first element. It should be noted in this case that the second element 26 has, besides the substantially planar chute guide surface RF, two side guiding surfaces 26.1 projecting in a vertical direction at the side edges. These prevent the sideways egress of milled material via the transfer chute 24. Such side guiding surfaces 26.1 can be provided by the shaping of the second element 26, by shaping an elastic second element 26 over the first element, as in the present case, or as separate elements.

The two elements 25 and 26 in this case can be arranged one behind the other or one on top of the other (as here), or a combination of at least partially one behind the other and at least partially one on top of the other, i.e. overlappingly in an overlap region. With respect to the series connection, in front and behind, and the overlapping arrangement, top or bottom in a vertical direction, the first element 25 and the second element 26 can be arranged in any combination relative to each other. The important thing is that, in any arrangement of the elements of the transfer chute relative to each other, there is an unbroken chute guide surface for the milled material, which continuously crosses the material transfer region 21 during normal operation, in particular irrespective of the milling depth and the associated positional adjustment of the transfer conveyor 11. However, the present embodiment is preferred, since wear effects due to passing milled material occur here only, or at least substantially only, on one of the two elements (the element 26 here).

It can provided that the first and second elements 25, 26 are also adjustable relative to each other. To this end, an appropriate connecting apparatus 40 can be provided, which functionally allows these two elements to be fixed in various relative positions to each other, for example for various thicknesses of the belt used, etc. To this end, the connecting apparatus, which is indicated schematically in FIG. 5B, can be configured for example as a clamp and/or screw connection or similar. It is particularly preferred if this type of adjustment thus allows a change in the clearance slit 28 between the upper return pulley 19 and the transfer chute 24, in particular the chute element 26. The impingement shield 30 shown in FIG. 4B is preferably arranged in such a way that it does not contact the connecting apparatus 40 even at maximum milling depth and thus with the transfer chute 24 maximally displaced with respect to the connecting apparatus 40.

It can also be provided, in particular for example with the aid of the connecting apparatus 40, that the second element 26 is replaceable separately from the first element 25, in particular in the manner shown, in such a way that it is not necessary to disassemble the entire transfer chute 24 for this purpose, but the second element 26 is detachable from the installed assembly of transfer conveyor 11 and transfer chute 24 and replaceable separately by itself, for example by detaching the connecting apparatus 40.

What is claimed is:

1. A ground milling machine, comprising:
   a machine frame;
   an operator platform;
   a drive engine;
   travelling apparatuses driven by the drive engine;
   a milling unit to mill ground material; and
   a conveying apparatus to transport milled material from the milling unit to a discharge point, with a transfer conveyor, and a loading conveyor which is downstream in a conveying direction, and with a material transfer apparatus arranged between the transfer conveyor and the loading conveyor in a material transfer region, the material transfer apparatus being configured so as to direct milled material from the transfer conveyor to the loading conveyor, and the transfer conveyor and the loading conveyor each comprising a support frame,
   wherein the material transfer apparatus comprises a milled-material-directing transfer chute and a locking apparatus,
   wherein the transfer chute has a chute guide surface extending at least partially in a horizontal direction and running in an at least partially descending manner from the transfer conveyor to the loading conveyor, wherein the transfer chute is arranged at least partially immovably with respect to the transfer conveyor, and wherein the transfer chute is pivotably adjustable relative to the transfer conveyor and/or linearly adjustable relative to the transfer conveyor, and wherein the transfer chute is lockable in various pivot and/or linear positions relative to the transfer conveyor with the locking apparatus.

2. The ground milling machine according to claim 1, wherein the transfer chute is arranged on the support frame of the transfer conveyor or on a covering of the material transfer apparatus.

3. The ground milling machine according to claim 1, wherein the transfer chute has two side guide walls running at sides of the chute guide surface, which are mounted as an extension on the support frame of the transfer conveyor or on a covering of the material transfer apparatus.

4. The ground milling machine according to claim 1, wherein the transfer chute leads to a receiving hopper arranged on the loading conveyor.

5. The ground milling machine according to claim 1, wherein an impingement shield is arranged on the transfer chute, which extends downwards, from a vertically lower side of the transfer chute.

6. The ground milling machine according to claim 1, wherein the transfer chute is configured in at least two parts with respect to elements forming the chute guide surface.

7. The ground milling machine according to claim 6, wherein the elements forming the chute guide surface are arranged adjustably relative to each other.

8. The ground milling machine according to claim 6, wherein the elements forming the chute guide surface are arranged so as to be separately replaceable.

9. The ground milling machine according to claim 6, wherein the transfer chute comprises a first element and a second element, the first and second elements being arranged one behind the other in the conveying direction.

10. The ground milling machine according to claim 9, wherein the first element is dimensionally stable and/or substantially non-elastic, and the second element is elastic.

11. The ground milling machine according to claim 6, wherein an element of the transfer chute is arranged directly on the machine frame and/or on the support frame of the transfer conveyor and another element of the transfer chute is arranged directly on the element of the transfer chute arranged directly on the machine frame and/or on the support frame of the transfer conveyor.

12. The ground milling machine according to claim 6, wherein the transfer chute comprises a first element formed of a metal or a plastic, and/or a second element formed of a flexible, elastic material.

13. The ground milling machine according to claim 12, wherein the metal of the first element is bent sheet metal, or the plastic of the first element is dimensionally stable plastic, or the flexible, elastic material of the second element is an elastic plastic or rubber.

14. The ground milling machine according to claim 1, wherein elements of the transfer chute are arranged overlappingly in an overlap region irrespective of a milling depth and associated adjustment of the transfer conveyor, such that an unbroken chute guide surface for the milled material is formed.

15. The ground milling machine according to claim 14, wherein the overlap region is arranged below a discharge point of the loading conveyor in a vertical direction.

16. The ground milling machine according to claim 1, wherein an upper return pulley of the transfer conveyor and a lower return pulley of the loading conveyor, viewed in a horizontal direction, are spaced apart from each other in the conveying direction which forms a spaced apart region, the transfer chute bridging at least 70% of the spaced apart region in the conveying direction.

17. The ground milling machine according to claim 16, wherein the transfer chute bridges at least 95% of the spaced apart region in the conveying direction.

18. The ground milling machine according to claim 1, wherein the transfer conveyor is arranged substantially within the machine frame.

19. The ground milling machine according to claim 1, wherein the locking apparatus comprises a detachable locking apparatus.

20. The ground milling machine according to claim 1, wherein the locking apparatus comprises an adjustably fixable locking apparatus.

21. The ground milling machine according to claim 1, wherein the transfer chute is lockable in various pivot and linear positions relative to the transfer conveyor with the locking apparatus.

22. The ground milling machine according to claim 1, wherein, when the transfer chute is locked relative to the transfer conveyor with the locking apparatus, the transfer chute is stationary relative to the transfer conveyor.

23. The ground milling machine according to claim 1, wherein the transfer conveyor is positionally adjustable relative to the machine frame as s function of milling depth.

24. A method of conveying milled material of a ground milling machine according to claim 1, the method comprising:
  milling the ground by the milling unit;
  transporting the milled material from the milling unit to the material transfer region by the transfer conveyor;
  transferring the milled material from the transfer conveyor to the material transfer apparatus arranged in the material transfer region;
  directing the milled material along the transfer chute of the material transfer apparatus;
  transferring the milled material on to the loading conveyor;
  transporting the milled material by the loading conveyor to the discharge point;
  discharging the milled material at the discharge point.

* * * * *